United States Patent [19] [11] 3,910,761
Hopkins [45] Oct. 7, 1975

[54] CONTROL SYSTEM FOR A STERILIZER
[75] Inventor: Charles L. Hopkins, Cincinnati, Ohio
[73] Assignee: Sybron Corporation, Rochester, N.Y.
[22] Filed: Nov. 28, 1973
[21] Appl. No.: 419,567

[52] U.S. Cl. ............ 21/93; 21/58; 21/94; 21/103; 21/DIG. 4
[51] Int. Cl.² A61L 3/00; A61L 3/02; A61L 13/04
[58] Field of Search ...... 21/58, 91, 94, 103, DIG. 4, 21/57, 93; 235/151.12; 23/253 A

[56] References Cited
UNITED STATES PATENTS

| | | | |
|---|---|---|---|
| 3,068,064 | 12/1962 | McDonald | 21/58 |
| 3,086,263 | 4/1963 | Huber | 21/91 |
| 3,533,764 | 10/1970 | Togneri | 235/151.12 |
| 3,607,091 | 9/1971 | Boyd | 23/253 A |
| 3,645,697 | 2/1972 | Hoffman | 23/253 A |

Primary Examiner—Barry S. Richman
Assistant Examiner—Bradley R. Garris
Attorney, Agent, or Firm—Theodore B. Roessel; Charles C. Krawczyk; J. Stephen Yeo

[57] ABSTRACT

A control system for gas-humidity sterilizers and the like that is responsive to the preheating of the sterilizing chamber and the preheating of fluids, such as gas and water to be inserted into the sterilizing chamber during the sterilizing cycle. Upon the completion of preheating, a timing sequence is enabled to allow the insertion of the plurality of fluids into the sterilizing chamber for preset timed intervals in preset sequences and providing an end of sterilization cycle indication in the event that the sterilization cycle has been processed within a preset period of time. The chamber temperature is monitored during sterilizing cycle to abort the cycle in the event that the temperature exceeds preset temperature limits. Gas, water and sterilizing chamber temperature are regulated within established limits during the sterilization cycle.

19 Claims, 7 Drawing Figures

CONTROL SYSTEM FOR A STERILIZER

BACKGROUND OF THE INVENTION:

This invention pertains to control systems in general, and more particularly, to control systems for controlling the heating and the insertion of fluids into sterilizers and the like.

The purpose for sterilizing is to kill microbes. Sterilizing can be accomplished by physical methods such as, for example, steam, dry heat, radiation, etc., and chemical methods such as, for example, the use of liquids, or gas, and a combination of both physical and chemical reactions. The steam method of sterilization is perhaps most well-known and most commonly used. The difficulty with the steam method is that it requires temperatures, running on the order of 250° to 270°F in pressurized chambers operating typically at 15–30 PSI. These high temperatures, at times, make it difficult to sterilize various items that are suceptible to damage at the high temperature. The radiation method of sterilizing bombards the items to be sterilized with gamma rays. However, such gamma bombardment may at times cause damage, such as for example, discoloration, brittleness, etc.

A sterilizer employing the combination of gas and humidity has the advantage in that it provides good sterilization at lower temperatures (in the order of 130°F) in non-pressurized chambers and with lower moisture requirement. In addition, the water, or the humidity in the sterilizing chamber, acts as a carrier to enhance penetration of the gas and thereby improves the sterilizing effect of the gas. It is therefore important that sufficient humidity is always present so that the proper amount of sterilizing is accomplished for the timing cycle alloted thereto. However, it is also very important to maintain the humidity below 100%, thereby preventing excessive moisture accumulating on goods to be sterilized, which would otherwise inhibit gas penetration. Furthermore, it is highly desirable that the combination of temperature and humidity used in the sterilizer chamber will be such that when the items sterilized are subsequently removed from the sterilizing chamber, the ratio of the relative humidity at the sterilizing temperature to the relative humidity at room temperature, does not cause condensation upon cooling at room temperature after sterilization. It is also highly desirable to introduce a controlled amount of humidity prior to gas insertion to greatly enhance gas penetration using humidity as a carrier.

Thus, as can be seen above, the process used in the gas-humidity sterilizer includes the variables of temperature, time, gas concentration and humidity. Each of these variables must be controlled for the optimum and correct amount of sterilization. The control system of this type of sterilizer must be able to monitor the preheating of the fluids prior to their insertion into the chamber, assure that the appropriate amount of gas concentration and humidity is present in the chamber, regulate the temperature within the chamber and temperature of the water and gas vapors during the sterilizing cycle to assure that proper sterilization is being achieved, monitor that the temperature in the chamber does not reach a point to damage the items therein, and control the duration of the sterilizing cycle.

Since the gas-humidity type sterilizers can operate at lower temperatures (in the order of 130°F) in an atmospheric pressure, they are particularly adapted for use as a small table top sterilizer that can be provided for use in the small doctor's office as well as hospitals. With the table top sterilizers, it is important that the sterilizer is relatively light weight (as compared to the sterilizers of prior art) so that it can be positioned on any fairly rigid table or countertop, and can be readily moved from place to place when desired. The control systems for sterilizers of the prior art, such as those disclosed in the U.S. Pat. Nos. 3,068,064 issued on Dec. 11, 1962 to R. L. McDonald and 3,093,449 issued on June 11, 1963 to L. R. Kotarski et al disclose electromechanical type control systems that are expensive and very heavy. Hence, it would be highly desirable, if the control system for this type of sterilizer would be a semi-conductor type, as compared to an electromechanical type of the prior art, to provide added versatility to the complex control system is addition to reducing the weight and expense thereof.

It is therefore an object of this invention to provide a new and improved control system for sterilizers and the like.

It is also an object of this invention to provide a new and improved semi-conductor control circuit for sterilizers.

It is a further object of this invention to provide a new and improved control system for gas-humidity sterilizers.

It is also an object of this invention to provide a new and improved control system for sterilizers for controlling the preheating of the sterilizing chamber and the fluids to be inserted therein, to control the timing sequence of the insertion of the fluids to assure the proper dose for sterilization, to provide the proper amount of heating for sterilization, and to control durations of the sterilizing sequence.

BRIEF DESCRIPTION OF THE INVENTION:

A control system for a sterilizer that preheats the sterilizing chamber and a plurality of fluids prior to the introduction of the fluids into the sterilizing chamber, and for controlling the dose, temperature, time, gas concentration and humidity within the sterilization chamber. A sequence enable control circuit, responsive to the completion of the preheating of the chamber and the preheating plurality of fluids, enables two timing circuit means and an under temperature detection circuit. First timing circuit means controls the insertion of the plurality of fluids into the chamber in a preset sequence. The chamber temperature is continuously regulated and additionally monitored to determine if the temperature therein has exceeded a preset limit. If the temperature exceeds a preset limit before or after the insertion of fluids therein, or if the chamber temperature drops below a preset limit after the insertion of the fluids therein, an abort circuit shuts off the entire system. The second timing circiut provides an end of sterilization cycle signal (in the event that the control system has not inadvertantly shut off due to noise, power failure, etc., within the preset period of time required for proper sterilization after the generation of the enabling signal by the sequence enable control circuit.

According to a feature of the invention, the first timing control circuit includes a first resistor-capacitor timing circuit responsive to the enabling signal to generate a first control signal upon the completion of a first timing interval, and a second resistor-capacitor timing circuit, responsive to the termination of the first timing interval, for generating the second control signal upon the completion of second preset timing interval. A first gating circuit is connected to the first resistor-capacitor timing circuit for delaying the insertion of a first fluid into the chamber in response to the first control signal, and once commencing, until the generation of the second control signal. A second gating circuit controls the insertion of a second fluid into the chamber during the time period between the enabling signal and the second control signal.

A further feature of the invention includes means for energizing the heaters in the sterilizing chamber and the fluid control chambers, regulating the temperature of each, and providing the control signals when preset preheat temperatures are reached. The control circuit monitors the control signal for the simultaneous presence of all the control signals, indicating that the preheat sequence is complete, and thereafter enables the sterilizing cycle.

Figure 1:
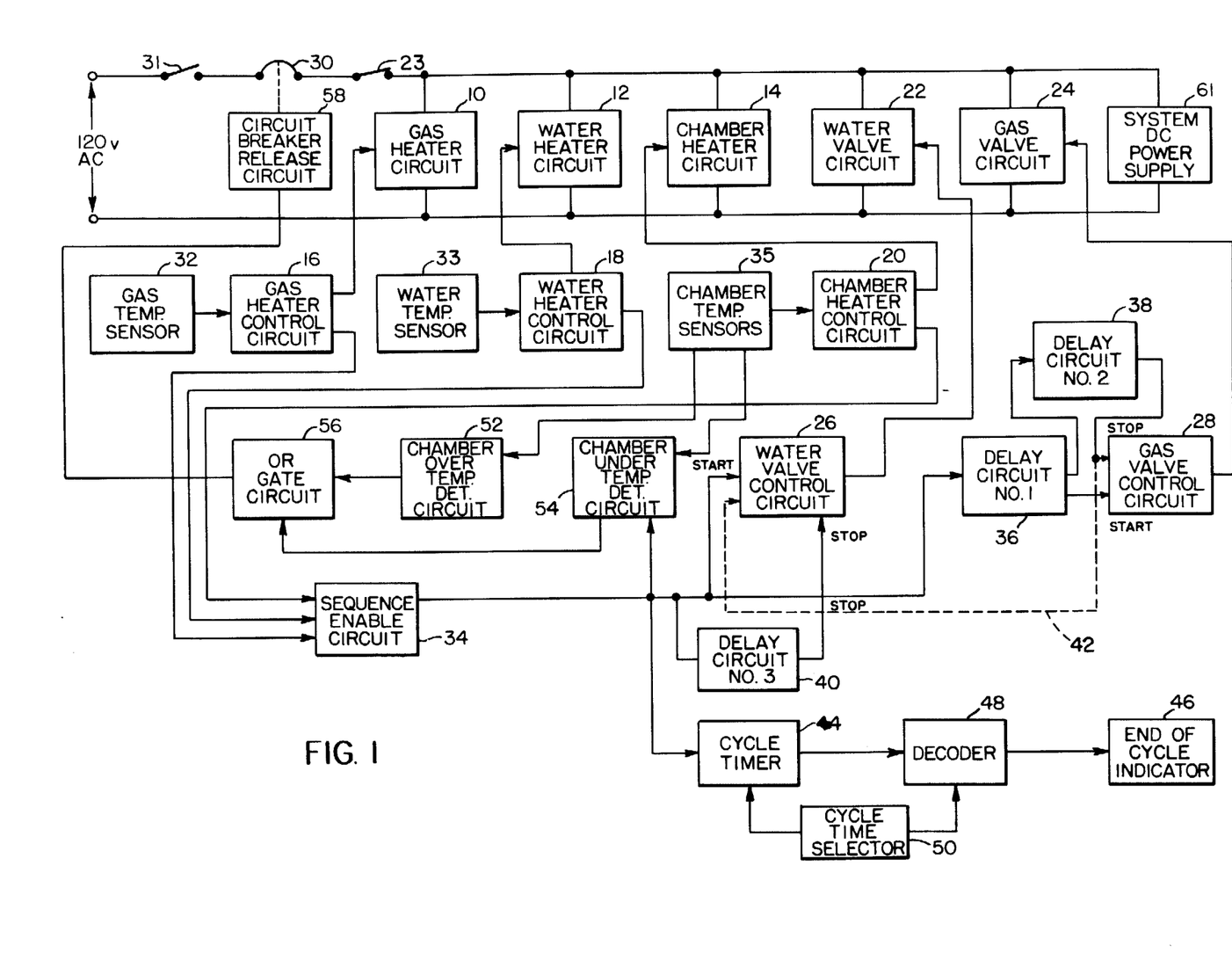
FIG. 1 is block diagram of a control system embodying the invention.
Figure 7:
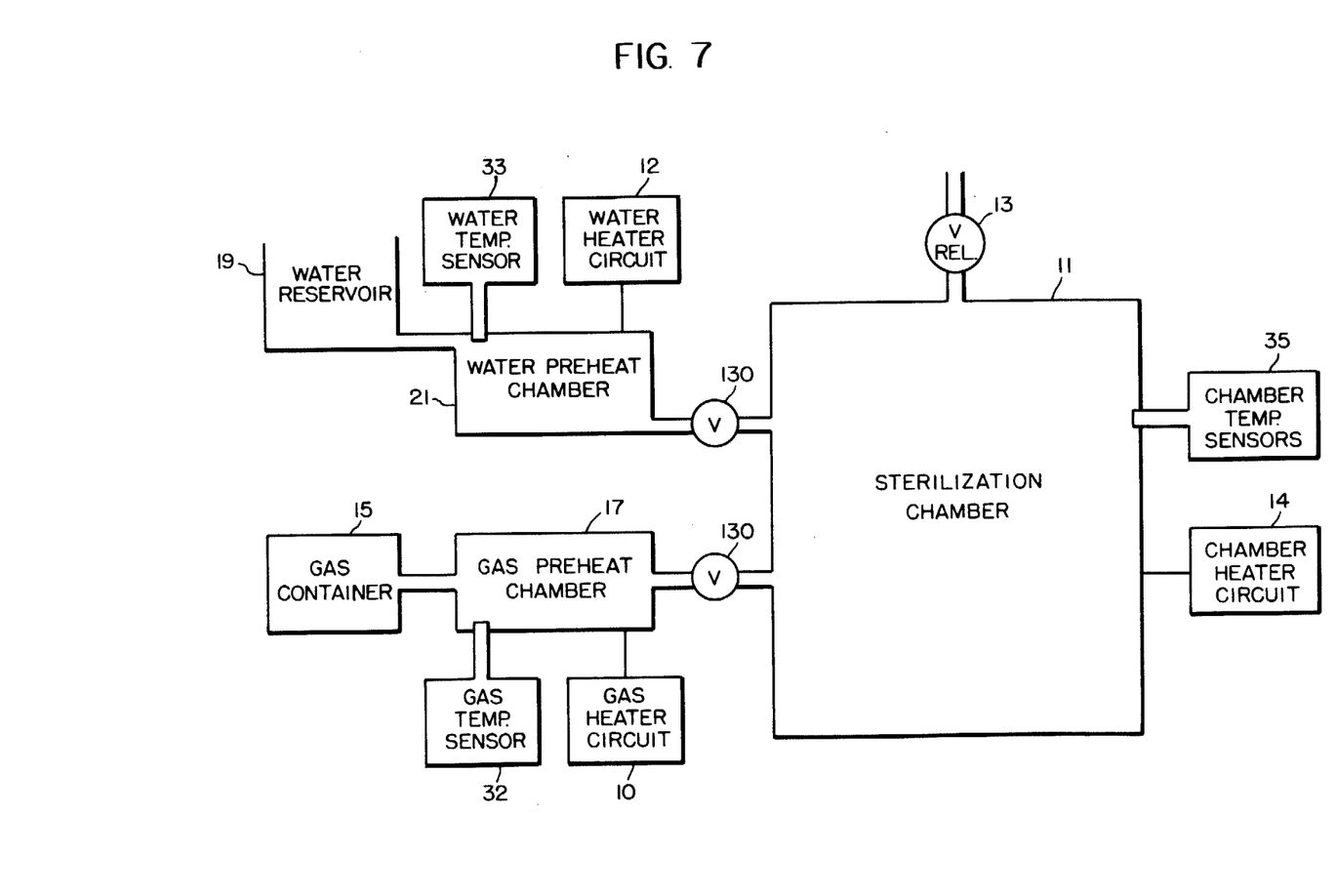
FIG. 7 is a block diagram of a sterilizer suitable for practicing the present invention.

DETAILED DESCRIPTION:

The block diagrams of FIG. 1 and 7 disclose a control system for controlling the preheating of fluids to be introduced into a sterilization chamber 11, for controlling the preheating of the sterilization chamber, for introducing the fluids into the sterilization chamber in proper timing sequence and intervals to provide the proper dose for sterilization, for controlling the temperatures during the sterilization cycle, for detecting the temperatures before the sterilization cycle and during the sterilization cycle to assure that the goods are not damaged and sufficient heat is present for proper sterilization, and for providing an indication that the sterilization cycle has been properly completed. The sterilizer chamber is of a type having a valve 13 to assure that the pressure within the sterilizing chamber remains approximately at atmospheric pressure. The fluids to be inserted into the sterilizing chamber, can, for example, be a sterilizing gas and steam. The gas can be the type specified in the U.S. Pat. No. 3,068,064. The sterilizing gas can be provided in an aerosol type container 15, the contents of which is inserted into a preheat chamber 17. The water to be inserted into the sterilization chamber may be provided by a small reservoir 19 and similarly inserted into a separate preheat chamber 21. The insertion of the sterilizing gas and water from the respective preheat chambers into the sterilizing chamber is controled by solenoid type valves 130. In the case of the water, the water is inserted into a preheat chamber to be converted into steam.

A gas heater circuit 10, a water heater circuit 12, and a chamber heater circuit 14 and under the control of a gas heater control circuit 16, a water heater control circuit 18, and a chamber heater control circuit 20, respectively, to control the heating of the gas and water in the preheat chambers, and the sterilizing chamber respectively. A water valve circuit 22 and a gas valve circuit 24, are under the control of a water valve control circuit 26, and a gas valve control circuit 28, respectively, to control the sequence and timing of the insertion of the water and gas into the sterilizing chamber. The gas, water, and chamber heater circuits 10, 12 and 14, and the water and gas valve circuits 22, and 24 are energized from the 120 volt 60 cycle AC line mains through a circuit breaker 30 and a power switch 31.

A gas temperature sensor 32 is located in the gas preheat chamber while a water temperature sensor 33 is located in the water preheat chamber. Chamber temperature sensors 35 are located in the sterilizing chamber. The gas, water and chamber temperature sensors 32, 33, and 35 provide temperature indications to the gas, water, and chamber heater control circuits 16, 18 and 20, respectively. When the switch 31 is initially closed, the gas, water, and chamber heater control circuits 16, 18 and 20 enable the gas, water, and chamber heater circuits 10, 12 and 14 respectively, to preheat the fluids and the sterilizing chamber to the appropriate preheat temperatures. When the appropriate temperatures have been reached, temperature sensors provide signals which cause the appropriate heater control circuit to shut off their heater circuit. In the event that the temperatures should drop below the desired levels, the heater control circuits will again energize the appropriate heater to raise the temperature to the desired limit. Each of the gas, water, and chamber heater control circuits 16, 18 and 20, have a second output circuit which provides a signal indicating that it's corresponding temperature sensor has indicated that the fluid or chamber has been brought up to the proper preheat temperature.

The second output circuit from each of the gas, water, and chamber heater cntrol circuits 16, 18 and 20 is connected to a sequence enable circuit 34 which monitors the three inputs for a simultaneous indication that the two fluids and the sterilizing temperatures have been brought up to the proper preheat temperature and thereafter is triggered to initiate the insertion of the fluids into the sterilizing chamber and start sterilizing timing cycle. The sequence enable circuit remains switched or latched to continuously generate the enable signal until the sterilization cycle is complete or the cycle is aborted. The heater control circuit continue to regulate the fluids or chamber at the proper temperature. In response to the enabling signal from the enable sequence circuit 34, the water valve control circuit 26 enables the water valve circuit 22 to allow the insertion of the water into preheat chamber and as water vapor into the sterilizing chamber. Two delay circuits, 36 and 40 are enabled by the sequence enable circuit 34. The delay circuits 36 and 38 form a series timing arrangement, wherein, the timing period of the delay circuit 36 is initiated by the sequence enable circuit 34 while the timing period of the delay circuit 38 is initiated by delay circuit 36 upon the completion of the latter timing period. The delay circuits 36 and 38 are connected to the gas valve control circuit 28. The gas valve control circuit 28 is enabled after the timing period of the delay circuit 36 has expired, Thereafter the gas valve circuit 24 will remain functional until the timing period of the delay circuit 38 has expired.

Upon the presence of the enable signal, the water valve control circuit 26 is triggered activating the water valve circuit 22 until the timing period of delay circuit 40 has expired. If both water and gas valves are to be cut off at the same time, the delay circuit 40 can be eliminated and the output of the delay circuit 38 can be connected to control the cut off of the water valve control circuit 26 as illustrated with the dashed line 42.

A cycle timer circuit 44 is also enabled by the sequence enable circuit 34 to start a timing sequence to provide an indication that the sterilizing cycle has proceeded for a sufficiently long period of time after the insertion of fluids into the sterilizer chamber. An end of cycle indicator 46 is connected to the cycle timer circuit 44 via decoder circuit 48 to provide a visual indication that the sterilization cycle has been completed. A cycle timer selector circuit 50 is connected between the cycle timer 44 and the decoder 48 to select the desired time duration for the sterilization cycle.

The chamber temperature sensors 36 are also connected to a chamber over temperature detection circuit 52 and a chamber under temperature detection circuit 54. The outputs of the chamber under and over detection circuits 52 and 54 are connected via an OR gate 56 to a circuit breaker release circuit 58. The under temperature detection circuit 54 is activated by the enable circuit 34 to sense the chamber temperature only after the chamber has been brought up to its proper preheat temperature and the sterilization cycle is started. The arrangement is such, that in the event the temperature of the chamber at any time exceeds a preset limit which can be dangerous to the items being sterilized, or in the event that, once the sequence enable circuit has been activated, the chamber temperature should drop below a limit for proper sterilization, a signal is transmitted via the OR gate 56 to the circuit breaker release circuit 58 to cut off the power to the sterilizer and thereby abort the sterilizing cycle. A system DC power supply 61 is connected to the sixty cycle line mains via the circuit breaker 30 and a door interlock switch 23 so that the DC power for all the timing circuits and heater control circuits will be cutt off in the event of the abort condition, or the door opened.

As can be seen in the block diagram of FIG. 1, the control system embodying the invention provides a means for preheating the fluids to be inserted into the sterilizing chamber to preset temperatures and also for preheating the chamber. Once the fluids and the chamber have been preheated, a sequence enable circuit allows the control system to insert the fluids into the sterilizing chamber in accordance with preset timing intervals and sequence wherein the water valve is actuated to immediately insert the water therein while the gas valve is actured only after a period of time when a sufficient humidity level has been achieved in the sterilizing chamber. The cycle timer 44 provides a time-out arrangement, once enabled by the sequence circuit, provide indication that the total sterilizing cycle has been properly completed. In the event of any over chamber temperature indication any time, or in the event of an under temperature indication during the sterilizing cycle, the sterilizing sequence is aborted and the control system shut down.

Figure 2:
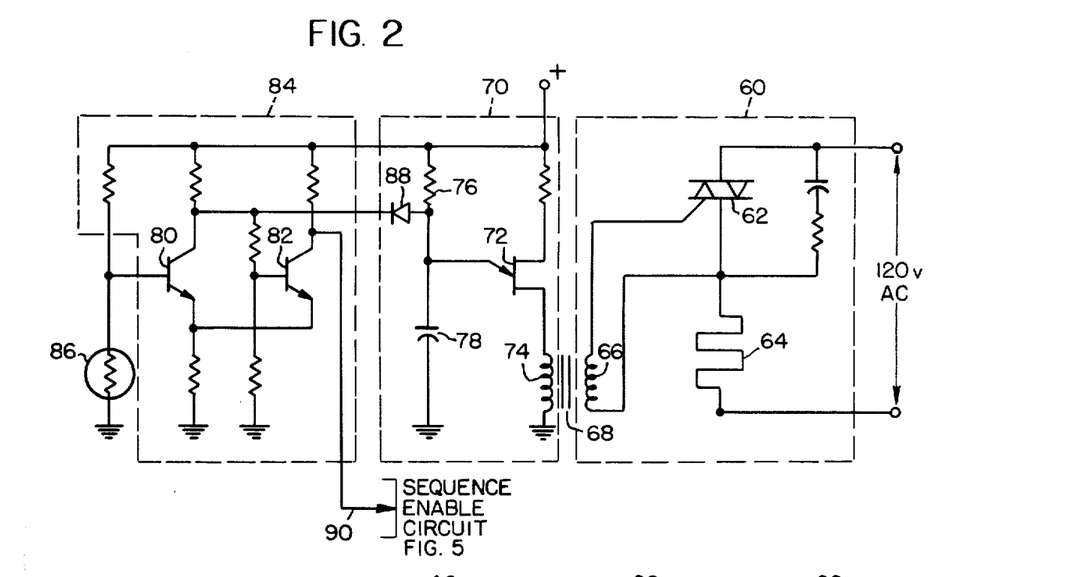
FIG. 2 is a schematic diagram of heater circuits and control circuit therefore for heating a sterilizing chamber and for heating fluids to be inserted into the chamber.

FIG. 2 is a schematic diagram of a circuit that will function as each of the gas, water and chamber heater circuits 10, 12, 14 and their gas, water and chamber control circuits 16, 18 and 20. The heater circuit is illustrated within the dashed lines 60. The heater circuit 60 includes a triac 62 connected in series with a heater 64 between the sixty cycle line mains. A secondary winding 66 of a transformer 68 is connected to the triac gate electrode to control the firing thereof. The heater 64 is energized as soon as the power switch 31 (FIG. 1) is closed, at which time a oscillator circuit is energized. The oscillator circuit 70 includes a unijunction transistor 72 that oscillates to apply trigger pulses to the primary winding 74 of the transformer 68 at a rate determined by the R-C time constant of a series circuit including a resistor 76 and a capacitor 78. The R-C time constant is selected so that the oscillator frequency is substantially higher than the frequency of the sixty cycle input power so that a trigger pulse is applied to the triac 62 at the very early portion of each half cycle of the AC power.

A pair of transistors 80 and 82 are connected in the form of a Schmidt trigger circuit (enclosed within the dashed lines 84). A temperature sensor, such as a thermistor, (more specficially a positive temperature coefficient thermistor PTC) is connected to the input circuit of the Schmidt trigger 84. The value of the resistors in the Schmidt trigger 84 are selected that, when the resistance of the PTC sensor 86 reaches a preset level indicating proper preheat temperature, the Schmidt trigger circuit 84 changes state wherein the transistor 80 conducts and via a diode 88, disables the oscillator circuit 70, while the transistor 82 switches to a non-conductive state which applies a signal via line 90 indicating to the sequence enable circuit 34 that the proper preheat temperature has been reached. The heater controls circuits 16, 18 and 20 activate the appropriate heater circuits 10, 12 and 14 as soon as the power is applied to the circuit. When the appropriate preheat temperature is reached, the Schmidt trigger 84 in the heater control circuit will then disable the oscillator circuit preventing any further conduction of AC power through the heater (until the temperature drips to a point to cause the sensor 86 to reset the Schmidt trigger) and also transmits a signal to the enabling control circuit 34 that the particular preheat sequence has been completed.

Figure 5:
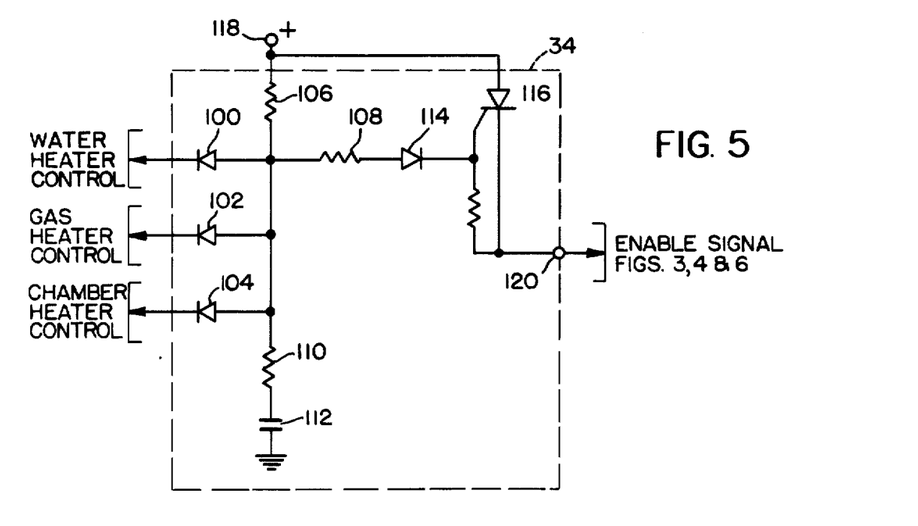
FIG. 5 is a schematic diagram of a sequence enabling circuit.

The second output from each of the gas, water, and chamber heater control circuits 16, 18 and 20 are connected via separate input circuits to the sequence enable circuit 34 as illustrated in FIG. 5. The sequence enable circuit 34 includes three input diodes 100, 102, and 104, three resistors 106, 108, and 110, a capacitor 112, and a decoupling diode 114 connected to form a diode AND gate. The diode 114 is connected to a trigger electrode of a controlled rectifier 116. The anode and cathode of the controlled rectifier 116 are connected between a DC power terminal 118 and an output terminal 120. The arrangment is such that when the water, gas, and sterilizing chamber have all been preheated to the proper preheat temperatures, an input signal is present at each of the diodes 100, 102 and 104, which enables the AND gate to apply a trigger signal to the controlled rectifier 116. The controlled rectifier is rendered conductive to apply DC power from the terminal 118 to: 1) the chamber under temperature detection circuit 54, 2) the cycle timer 44, 3) the delay circuit 36, and 4) the water and gas valve control circuits 26 and 28, thereby enabling the sterilizing cycle to proceed.

When the controlled rectifier 116 is rendered conductive, power is applied via line 122 (FIG. 3) to the water control valve circuit 26 and the delay circuits 36 and 40. The water and gas valve control circuits 26 and 28 include a unijunction oscillator circuit of the type described with regard to FIG. 2 having an oscillation rate that is substantially greater than the frequency of the sixty cycle AC power applied to the water and gas valve circuits 22 and 24. Each of the gas and water valve circuits 22 adn 24 include a solenoid that is connected to the sixty cycle line mains via a pair of back to back connected controlled rectifiers 132, 134, which are rendered conductive by the trigger pulses from the oscillators 26 and 28 via the transformers 136. At the same time the control circuit 26 is energized, the delay circuits 36 and 40 are also energized to begin their timing period. Each of the delay circuits 36, 38 and 40 include a programable unijunction transistor (PUT) 140, wherein the anode gate electrode thereof is connected between the junction of the resistors 142 and 144 to set a trigger level, while the anode is connected to the junction of a series R-C circuit including a resistor 146 and a capacitor 148. The output of the transistor (PUT) 140 is connected to a trigger electrode of a controlled rectifier 150. In the delay circuits 38 and 40 the controlled rectifier 150 is connected between the enable signal line 122 and ground through a resistor 154, and the trigger pulse thereof is developed across a resistor 156. In the case of the delay circuit 36, the controlled rectifier 150 is connected between the enable signal 122 line and ground through a resistor 158 connected to the cathode thereof. The output of the transistor 140 is connected to the trigger electrode of the controlled rectifier 150 via a decoupling diode 160 to develop a trigger pulse across a resistor 162.

Figure 3:
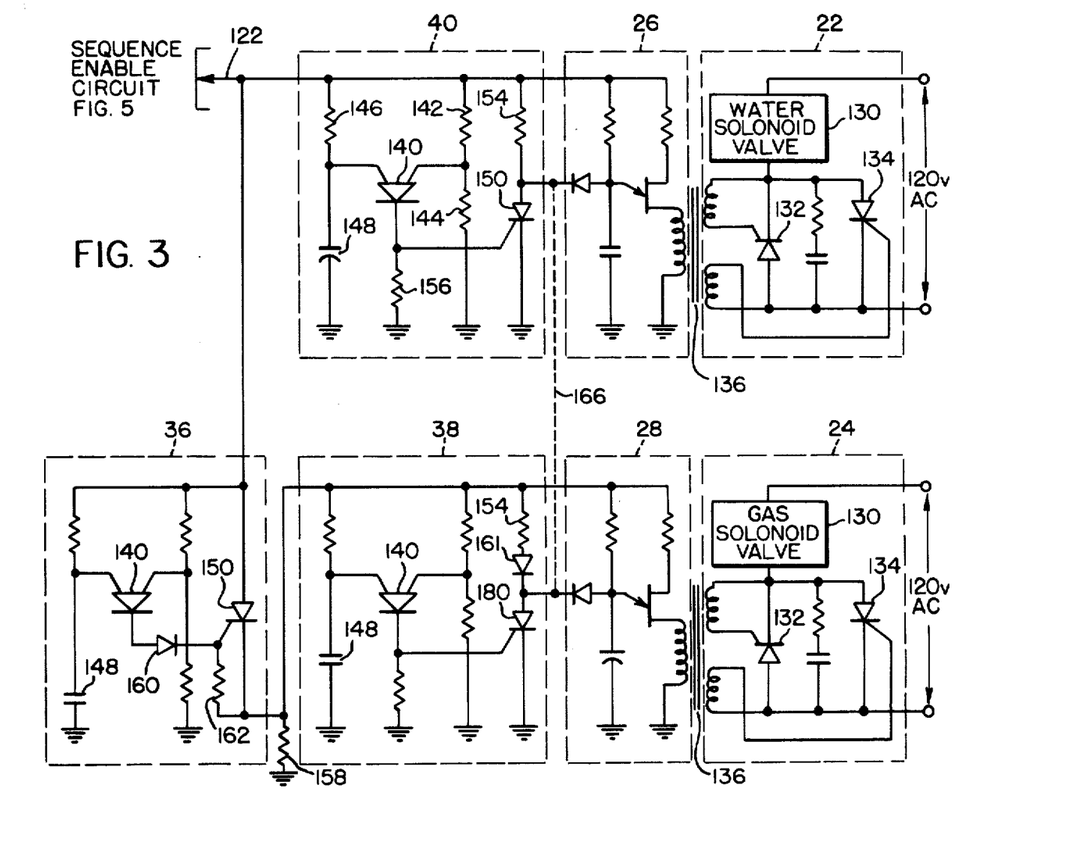
FIG. 3 is an electrical schematic diagram of a timing circuit for controlling the insertion of the fluids into the sterilizing chamber.

The arrangement is such that the timing period of the delay circuits 36 and 40 start when the controlled rectifier 116 in the sequence enable circuit 34 is rendered conductive to apply power to the delay circuits. The capacitor 148 through the resistor 146 at a rate determined by the R-C time constant thereof. When the capacitor 148 has reached a charge related in level to the bias potential established by resistors 142 and 144, the transistor 140 conducts to apply a trigger pulse to the controlled rectifier 150. In the case of the delay circuit 40, when the controlled rectifier 150 fires it applies a cut off signal to the oscillator 26. In the case of the delay circuit 36, when the control rectifier 150 fires it applies power from the enable signal line 122 across the resistor 158 to energize the time dealy circuit 38 and start its timing period. When the potential across the capacitor 148 of the delay circuit 38 reached the trigger level, the transistor 140 conducts producing a trigger signal applied to the controlled rectifier 150, which in turn applies a cut off signal to the oscillator 28.

Hence, as can be see, the water solenoid valve is turned on as soon as the power is applied to the line 122. The water solenoid valve continues to be operated until the time out period of the delay circuit 40 has been expired. The gas solenoid valve does not operate until the time out period of the delay circuit 36 has expired, at which time the oscillator circuit 28 will be energized to operate the gas solenoid valve. The gas solenoid valve will continue to be operated until the time out period of the delay circuit 38 is expired, at which time the oscillator 28 is cut off.

The arrangement shown in FIG. 3 provides separate delay circuits for the water and gas control circuits. If, on the other hand, it is desired to shut off the water and gas solenoid valves off simultaneously, the delay circuit 40 can be eliminated and the output circuit of the delay circuit 38 can be connected to the oscillator 26 (as designated with the dashed line 166) to cut off both oscillators 26 and 28 simultaneously. A blocking diode 161 must also be added to prevent a return through resistors 154 and 158.

Figure 6:
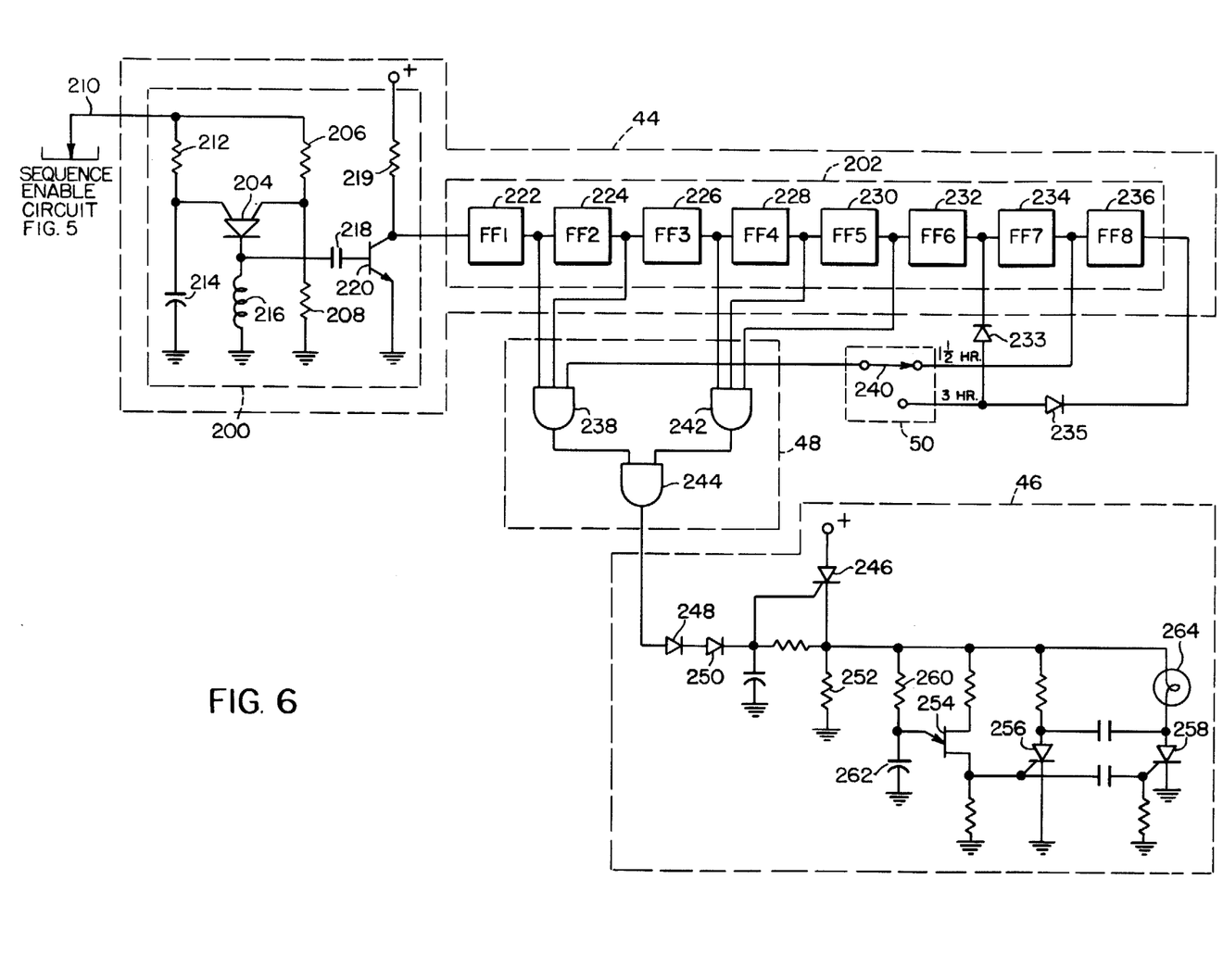
FIG. 6 is a schematic diagram of timing circuit for providing an indication that the sterilization cycle has been properly completed.

A schematic diagram of the cycle timer 44, the decoder 48 and the end of the cycle indicator 46 is illustrated in FIG. 6. The cycle timer includes a pulse generator circuit 200 and a counter circuit 202. The pulse generator circuit 200 includes a resistor-capacitor timing circuit having a programmable unijunction transistor 204 with the anode gate connected to the junction of the resistors 206 and 208 and with the anode connected to the series R-C circuit between a resistor 212 and a capacitor 214. The R-C time constant of resistor 212 and capacitor 214 provides the timing cycle of the pulse generator, such as for example in the order of sixty seconds. The one minute pulses are coupled via a shaping circuit comprised of an inductor 216, a capacitor 218, a resistor 219 and a transistor 220 to a first flip-flop 222 in the counter circuit 202. Eight flip-flop circuits 222--236 are connected in a conventional counting circuit. The input circuits of the decoder circuit 48 are connected to specific stages of the counter 202. For example the AND gate 238 is connected to the outputs of the flip-flops 222 and 224 and also via the cycle time selector circuit 50 (illustrated as the switch 240) to either the output stage of flip-flop 234 or through combining diodes 233 and 235 to the output stages of flip-flop 232 and 235. The input circuits and the AND gate 242 are connected to the output circuits of the flip-flops 226, 228 and 230. The output circuits of the AND gates 238 and 242 are connected to the input circuits of an AND gate 244. If the switch 240 is in the position as illustrated, the decoder parity arrangement is such that the AND gate 244 is enabled to produce an output signal after one 1½ hours of sterilization time. If the switch 240 is moved to the other position, the decoder parity arrangement is changed so that the AND gate 244 produces an output signal only after 3 hours of sterilizationn time. The combination of the counter circuit and the decoder parity arrangment provides a high degree of noise immunity over the long time durations required for the sterilization cycle to complete. The output of the AND gate 244 applies a trigger signal to controlled rectifier 246 via a pair of diodes 248 and 250. The controlled rectifier 246 is fixed to generate a potential across a resistor 252 to provide the energization potential for a unijunction oscillator circuit including the transistor 254. The oscillator circuit applies trigger pulses to a pair of commutating controlled rectifiers 256 and 258 at a rate determined by the R-C time constant of the series circuit including a resistor 260 and a capacitor 262. The output of the controlled rectifier 258 is connected to a lamp 264.

The arrangement is such that once the controlled rectifier 246 is fired, the oscillator circuit provides trigger pulses to the controlled rectifiers 256 and 258 wherein the controlled rectifiers are rendered alternately conductive at the oscillation rate, whereby the lamp 264, provides a blinking signal indicating the end of a sterilization cycle.

Figure 4:
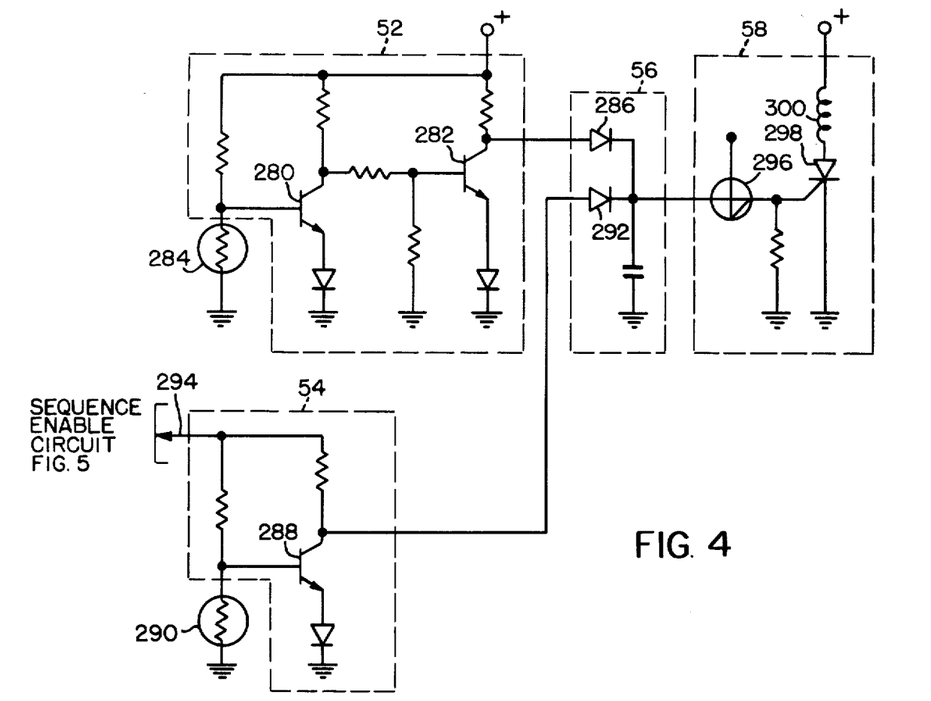
FIG. 4 is a schematic diagram of sterilization over and under temperature detection circuits and an abort circuit.

FIG. 4 illustrates the over and under detection circuits along with the circuit breaker release circuit. The chamber over temperature detection circuit 52 incudes a pair of directly coupled transistors 280 and 282 connected as a direction current inverting amplifier. The input to the transistor 280 is connected to a chamber temperature sensor 284, such as a PTC thermistor. The collector of the transistor 282 is connected to an input diode 286 of an OR gate 56. The chamber over temperature detection circuit 52 is energized when the power is initially applied to the control circuit so that it can monitor the temperature of the chamber before and during the sterilization cycle. The chamber under temperature detection circuit 54 includes a single transistor 288, the base of which is connected to a temperature sensor 290. The collector of the transistor 288 is connected to the second input diode 292 of the OR gate 56. The arrangement is such, that in the event that the temperature exceeds a preset limit before or after the sequence enable circuit 34 initiaties the sterilization cycle, the output of the detection circuit 52 will enable the OR gate 56 to apply an alarm signal to the circuit breaker release circuit 58. The power for operating the chamber under temperature detection circuit 54 is recieved via line 294 from the sequence 34 so that the under temperature detection circuit is not operative until the sterilization cycle has begun. This will allow the chamber temperature to be brought up to the preheat temperature before the detection circuit 54 is activated. Thereafter, should the sterilization chamber temperature drop to a point that proper sterilization cannot be assured, the alarm signal is transmitted through the OR gate 56 to the release circuit 58. The release circuit 58 includes a silicon unilateral switch (SUS) triggering device 296 providing a threshold level for operating the circuit thereby minimizing problems due to electrical noise. The OR gate 56 is coupled via the SUS device 296 to the trigger gate of a controlled rectifier 298 which is connected in series with a circuit breaker release coil 300. In the event of an over temperature situation, or in the case of an under temperature situation during the sterilizing cycle, the coil 300 is energized to release the circuit breaker and remove the power from the control system thereby aborting the entire sterilization cycle. As illustrated in FIG. 1, when the circuit breaker 30 is released, the DC power supply 61 is deenergized. When the DC power supply is deenergized, no more power is available for operating any of the oscillator circuits and the time out circuits. In addition, the cycle timer will be also deenergized. The circuit breaker release circuit 58 can include an indicating device indicating to the operator that the sterilization cycle has been aborted.

The main chamber door interlock switch 23 is provided to interrupt all AC power upon the opening of the chamber door. As in the case of the under and over temperature abort circuit, all heater, time and logic circuits are completely de-energized when the door (switch 23) is opened, such as for example at the end of a complete sterilization cycle when the goods are removed. The arrangement of the control circuit is such that the electronic circuits are reset to a start condition upon the deenergization and/or subsequent application or power and are thereby automatically preset to initiate the next sterilization cycle.

What is claimed is:

1. A control system for a sterilizer, said sterilizer having
    a. a sterilizing chamber;
    b. means for inserting a plurality of fluids into said sterilizing chamber;
    c. a plurality of fluid control units for controlling said inserting means; and
    d. means for preheating to a predetermined degree said sterilizing chamber and said fluids, prior to insertion of said fluids into said sterilizing chamber;
said control system comprising:
    sequence enable circuit means responsive to the completion of the preheating of said chamber and of said plurality of fluids to provide an enabling signal upon the attainment of said predetermined degree;
    first timing circuit means connected to said fluid control units and responsive to said enabling signal, for activating said plurality of fluid control units in a preset sequence for the insertion of said plurality of fluids into said sterilizing chamber at preset timed intervals;
    chamber temperature sensing means;
    over temperature detection circuit means connected to said chamber temperature sensing means for providing an abort signal when the sterilizing chamber temperature exceeds a preset temperature limit;
    under temperature detection circuit means connected to said chamber temperature sensing means responsive to said enabling signal for providing an abort signal when the sterilizing chamber temperature drops below a preset temperature limit;
    abort circuit means connected to both said over and under temperature detection circuit means for shutting off the control system in response to an abort signal; and
    second timing circuit means, responsive to the enabling signal and enabled thereby to provide an end of sterilizatin cycle indication in the event that the control system has not been shut-off within a preset period of time after the generation of said enabling signal.

2. A control system as defined in claim 1 wherein said first time circuit means includes;
    a plurality of oscillator circuit means, one connected to each of said fluid control units, for activating the connected fluid control units in response to said enabling signal;
    resistor-capacitor timing circuit means, responsive to said enabling signal, for initially delaying the operation of one of said oscillator circuit means for preset period of time, and deactivating the operation of a said plurality of oscillator circuit means after other preset timing periods; and
    wherein the enabling signal produced by said sequence enable circuit means provides the energization potential for each of said oscillator circuit means and said resistor-capacitor timing circuit means.

3. A control system as defined in claim 2 wherein:
said resistor-capacitor timing circuit means includes a first and a second resistor-capacitor timing circuit; the first resistor-capacitor timing circuit is energized by said enabling signal; the second resistor-capacitor timing circuit is energized by said first resistor-capacitor timing circuit upon a completion of a preset time delay period; and upon the completion of the time delay period of the second resistor-capacitor timing circuit each of said oscillator circuit means is disabled.

4. A control system as defined in claim 3 wherein each of said first and second resistor-capacitor timing circuits includes:
a prgrammable unijunction transistor, the anode gate electrode of which is connected to a resistor divider circuit and the anode electrode is connected to a resistor-capacitor series circuit;
a controlled rectifier coupled to said programmable unijunction transistor so as to be triggered conductive when said programmable unijunction transistor is conductive, and
wherein said programmable unijunction transistor, the resistor divider, the resistor-capacitor series circuit and the controlled rectifier are energized by said enabling signal.

5. A control system as defined in claim 3 wherein:
said oscillator circuit means includes a unijunction oscillator circuit; a control rectifier device in series with the fluid control unit from 60 cycle line mains and triggered by said unijunction oscillator circuit.

6. A control system as defined in claim 5 including:
separate oscillator circuit means coupled to each of the preheating means for said plurality of fluids and said sterilizing chamber; and
a plurality of temperature control circuit means, a separate one connected to each of said oscillator circuit means, and arranged to sense the temperature of each of said fluids and said chamber, for both deactivating the connected oscillator circuit means and providing a signal to said fluid control units when the preset temperature is reached.

7. A control system as defined in claim 6 wherein:
each of said preheating means includes a heater and a control rectifier circuit for energizing the heater from sixty cycle line mains upon being triggered, and said oscillator circuit means includes a unijunction oscillator circuit for providing the trigger pulses to the control rectifier circuit.

8. A control system for a sterilizer having a heater for preheating a sterilizing chamber, a plurality of heaters for separately preheating a plurality of fluids to be introduced to the sterilizing chamber, and a plurality of electrically operated valves for controlling the insertion of fluids into the sterilizing chamber, said control system comprising:
temperature control means for energizing each of said heaters and for providing a control signal when the sterilizing chamber and said plurality of fluids have been heated to preset temperatures;
resistor-capacitor timing circuit means responsive to said control signal for activating said plurality of electrically operated valves in a preset sequence for the insertion of said plurality of fluids to said sterilizing chamber for preset timed intervals;
over temperature detection circuit means for providing an abort signal when the sterilizing chamber temperature is above a preset limit;
under temperature detection circuit means, responsive to said control signal for providing an abort signal when the sterilizing chamber temperature has dropped below a preset limit;
abort circuit means responsive to a signal from at least one of said over and under detection circuit means for shutting off the control system; and
counter-decoder timing circuit means, responsive to the control signal, for providing an end of sterilization cycle indication in the event that the control system has not been shut off within a preset period of time after the generation of said control signal.

9. A control system for a sterilizer,
said sterilizer having:
a. a sterilizing chamber;
b. means for inserting a plurality of fluids into said sterilization chamber;
c. a plurality of fluid control units for controlling said inserting means; and
d. means for preheating to a predetermining degree, said sterilizing chamber and said fluids, prior to insertion of said fluids into said sterilizing chamber; said control system comprising:
sequence enable circuit means responsive to the completion of the preheating of said chamber and said plurality of fluids to provide an enabling signal;
firt timing circuit means including a resistor-capacitor timing circuit responsive to said enabling signal, for translating the enabling signal after the completion of a first preset timing interval;
second timing circuit means including a resistor-capacitor timing circuit responsive to the enabling signal translated by said first timing circuit means for generating a control signal upon the completion of a second preset timing interval;
first and second fluid control means for controlling the introduction of said preheated fluids into said sterilizing chamber when activated;
first gating circuit means connected to said sequence enable circuit means, said second timing circuit and said first fluid control means for activating said first fluid control means in response to said enabling signal and until the generation of said control signal; and
second gating circuit means, connected to said second timing circuit means, and to said second fluid control means, so that in response to the translation of said enabling signal by said first timing circuit means, said second fluid control means is activated until the generation of said control signal.

10. A control system as defined in claim 9 wherein both of said resistor-capacitor timing circuits include:
a programmable unijunction transistor, the anode gate electrode thereof being connected to a resistor divider circuit and the anode electrode being connected to a resistor-capacitor series circuit;
a controlled rectifier coupled to said programmable unijunction transistor to be rendered conductive when said programmable unijunction transistor is conductive;
wherein said programmable unijunction transistor, the resistor divider, the resistor-capacitor series circuit, and the controlled rectifier of said first timing circuit means are energized by said enabling signal, and wherein said programmable unijunction transistor, the resistor divider, the resistor-capacitor series circuit, and the controlled rectifier for said second timing circuit means are energized by the enabling signal translated by said first timing circuit means.

11. A control system as defined in claim 10 wherein both said first and said second gating circuit means include:

controlled rectifier circuit connected to one of said fluid control means for energizing the connected fluid control means from an AC power source;

oscillator circuit means for generating trigger pulses for rendering the controlled rectifier circuit conductive;

wherein said oscillator circuit means in said first gating circuit means is energized by said enabling signal and is deactivated by said control signa; and wherein said oscillator circuit means in said second gating circuit is energized by the enabling signal translated by said first gating circuit means and is deactivated by said control signal.

12. A control system for a sterilizer,
said sterilizer having:
  a. a sterilizing chamber;
  b. means for inserting a plurality of fluids into said sterilizing chamber;
  c. a plurality of fluid control units for controlling said inserting means; and
  d. means for preheating to a predetermined degree said sterilizing chamber and said fluids, prior to insertion of said fluids into said sterilizing chamber;

said control system comprising:

sequence enable circuit means responsive to the completion of the preheating of said chamber and said plurality of fluids to provide an enabling signal;

first timing circuit means including a first resistor-capacitor timing circuit, responsive to said enabling signal, for generating a first control signal after the completion of a first preset timing interval;

second timing circuit means including a pair of second resistor-capacitor timing circuits responsive to said enabling signal for generating second and third control signals upon the completion of second and third successive preset timing intervals respectively;

first and second fluid control means for controlling the introduction of said preheated fluids into said sterilizing chamber when activated;

first gating circuit means connected to said sequence enable circuit means, said first timing circuit, and said first fluid control means for activating said first fluid control means in response to said enabling signal and until the generation of said first control signal; and second gating circuit means, connected to said sequence enable circuit means, and said second fluid control means, so that in response to the simultaneous presence of said enabling signal and said second control signal said second fluid control means is activated until the generation of said third control signal.

13. A control system as defined in claim 12 wherein said first and second resistor-capacitor timing circuits include:

a prgrammable unijunction transistor, the anode gate electrode thereof being connected to a resistor divider circuit and the anode electrode being connected to a resistor-capacitor series circuit;

a controlled rectifier coupled to said programmable unijunction transistor to be rendered conductive when said programmable unijunction transistor is conductive;

wherein the programmable unijunction transistor, the resistor divider, the resistor-capacitor series circuit and the controlled rectifier in said first timing circuit means and one of the programmable unijunction transistor, the resistor divider, the controlled rectifer in said second timing circuit means are energized by enabling signal, and wherein the other of the programmable unijunction transistor, the resistor divider, the resistor-capacitor series circuit, and the controlled rectifier of said second timing circuit means are energized by said first control signal.

14. A control system as defined in claim 13 wherein said first and second gating means include:

controlled rectifier circuit means connected to one of said fluid control means for energizing the connected fluid control means from an AC power source;

oscillator circuit means for generating trigger pulses for rendering the controlled rectifier conductive;

wherein said oscillator circuit means in said first gating circuit means is energized by said enabling signal and is deactivated by said second control signal and wherein said oscillator circuit means in said second gating circuit is energized by said signal and is deactivated by said third control signal.

15. A control system for a sterilizer including a sterilizing chamber having an electrical heater, a water chamber having an electrical heater, a gas chamber having an electrical heater, an electrically operated control unit for controlling the insertion of gas into the sterilizing chamber, and an electrically operated control unit for controlling the insertion of water into the sterilizing chamber, said control system comprising:

gas temperature control circuit means for energizing the gas heater for heating the gas to a preset temperature and providing a control signal when the preset temperature is reached;

water temperature control circuit means for energizing the water heater for heating the water chamber to a preset temperature and providing a control signal when the preset temperature is reached;

sterilizing chamber temperature control circuit means for energizing the sterilzing chamber heater for heating the sterilizing chamber to a preset temperature and providing a control signal when the preset temperature has been reached;

gas control circuit means for operating said gas control unit;

water control circuit means for operating said water control unit;

over temperature detection circuit means detecting when the sterilizing chamber temperature is above a preset limit for providing an abort signal first timing circuit means, responsive to an enabling signal, for activating said gas and water control circuit means for the insertion of gas and water into said sterilzing chamber for preset timing intervals and in a preset sequence;

under temperature detection circuit means, responsive to an enabling signal, for providng an abort signal when the sterilizing chamber temperature has dropped below a preset level;

abort circuit means responsive to a signal from at least one said over and under temperature detection circuit means for shutting off the control system;

second timing circuit means, responsive to an enabling signal, for providing an end of cycle indication in the event the control system has not shut off within a preset period of time after the initiation of said enabling signal; and sequence enable circuit means responsive to the simultaneous presence of control signals from the gas, water and sterilizing chamber temperature control circuit means for applying an enabling signal for activating said under temperature detection circuit means, said first and second timing circuit means, said water control circuit means, and said gas control circuit means.

16. A control system as defined in claim 15 wherein:
each of said gas, water and sterilizing chamber temperature control circuit means includes: an oscillator; a controlled rectifier circuit means connected to said oscillator for energizing the heaters from sixty cycle line mains when driven by said oscillator; a sensor for sensing temperatures; and a threshold circuit for cutting off the associated oscillator when a preset temperature has been reached and for providing said control signal.

17. A control system as defined in claim 15 wherein said first timing circuit includes:
a plurality of oscillator circuit means, one for each of said gas and water control circuit means, said oscillator circuit means upon the energization thereof actuates the associated gas and water control circuit means, and resistor-capacitor timing circuit means, responsive to said enabling signal for initially delaying the operation said oscillator circuit means for the gas control circuit means for a preset period of time after the water oscillator circuit means is enabled and thereafter deactivating the operation of said gas and water oscillator circuit means, said resistor-capacitor timing circuit means providing the energization potential for said gas oscillator circuit means.

18. A control system as defined in claim 17 wherein:
said resistor-capacitor timing circuit means includes a first and second resistor-capacitor timing circuit, wherein the first resistor-capacitor timing circuit is energized by said enabling signal, wherein said gas oscillator circuit means and said second resistor-capacitor timing circuit are energized by said first resistor-capacitor timing circuit upon a completion of a preset time delay period, and upon the completion of the time delay period of the second resistor-capacitor timing circuit both of said gas and water oscillator circuit means are disabled.

19. A control system as defined in claim 18 wherein said resistor-capacitor timing circuits include:
a resistor divider circuit;
a resistor-capacitor series circuit;
a programmable unijunction transistor, the anode gate electrode thereof being connected to said resistor divider circuit and the anode electrode being connected to said resistor-capacitor series circuit;
a controlled rectifier coupled to said programmable unijunction transistor to be rendered conductive when said programmable unijunction transistor is conductive, and
wherein said programmable unijunction transistor, the resistor divider, the resistor-capacitor series circuit and the controlled rectifier are energized by said enabling signal.

* * * * *

UNITED STATES PATENT OFFICE
CERTIFICATE OF CORRECTION

Patent No. 3,910,761            Dated October 7, 1975

Inventor(s)   Charles L. Hopkins

It is certified that error appears in the above-identified patent and that said Letters Patent are hereby corrected as shown below:

Column, 5, line 51, "cuff" should be --cut--.
          line 63, "actured" should be --actuated--.
          line 66, before "pro-" insert --to--.

Column 7, line 17, "adn" should read --and--.
          line 48, after "148" insert --charges--.
          line 58, "dealy" should be --delay--.
          line 64, "see" should be --seen--.

Column 8, line 16, after "return" insert --path--.

Column 8, line 49, before "1 1/2" delete word --one--.
Column 9  line 27, "initiaties" should be --initiates--.
          line 32, "recieved" should be --received--.
          line 32, after "sequence" insert --enable circuit--.

Column 11, line 16, "prgammable" should be --programmable--.

Column 12, line 21, "sterilization" should be --sterilizing--.
           line 31, "firt" should be --first--.

Column 14, line 4, "prgrammable" should be --programmable--.
           line 18, after "by" insert --said--.
           line 38, after "by said" insert --second control--.

Signed and Sealed this fourth Day of May 1976

[SEAL]

Attest:

RUTH C. MASON
Attesting Officer

C. MARSHALL DANN
Commissioner of Patents and Trademarks